Figure 1:
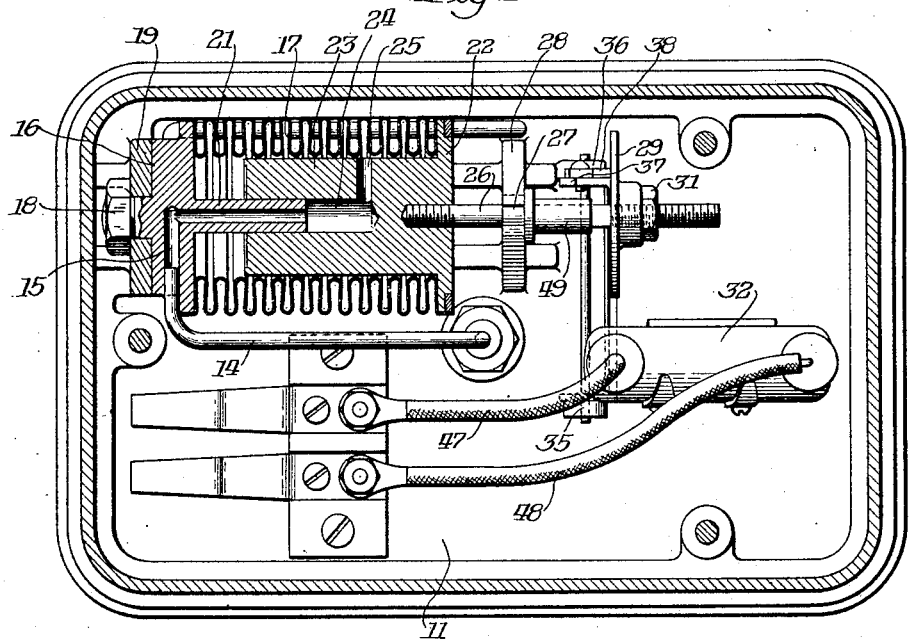

June 18, 1929.  H. J. SAUVAGE  1,717,628

THERMOSTATIC ELECTRIC SWITCH

Filed Jan. 11, 1927

Inventor:
Herbert J. Sauvage
By Walter M. Fuller
Atty

Patented June 18, 1929.

1,717,628

UNITED STATES PATENT OFFICE.

HERBERT J. SAUVAGE, OF CHICAGO, ILLINOIS, ASSIGNOR TO TRUSTEES OF THE ELECTROTHERMOSTATIC CONTROL COMPANY, OF CHICAGO, ILLINOIS, A TRUST ESTATE.

THERMOSTATIC ELECTRIC SWITCH.

Application filed January 11, 1927. Serial No. 160,385.

My invention pertains to features of novelty and betterment, both structural and functional, in electric-switches, especially those actuated by thermostatic or pressure means, incorporating, for example, the well-known style of bellows or accordion form of expansible and contractible member.

In the present instance, in the preferred embodiment of the invention, such member and all conduit connections therewith are completely filled with a liquid the expansion and shrinkage of volume of which result in the closing and opening of the electric-switch.

To enable those skilled in this art to have a full and complete understanding of the invention, a present preferred embodiment thereof has been illustrated in detail in the accompanying drawing forming a part of this specification and throughout the views of which like reference characters have been employed for the same parts of the structure.

Figure 2:
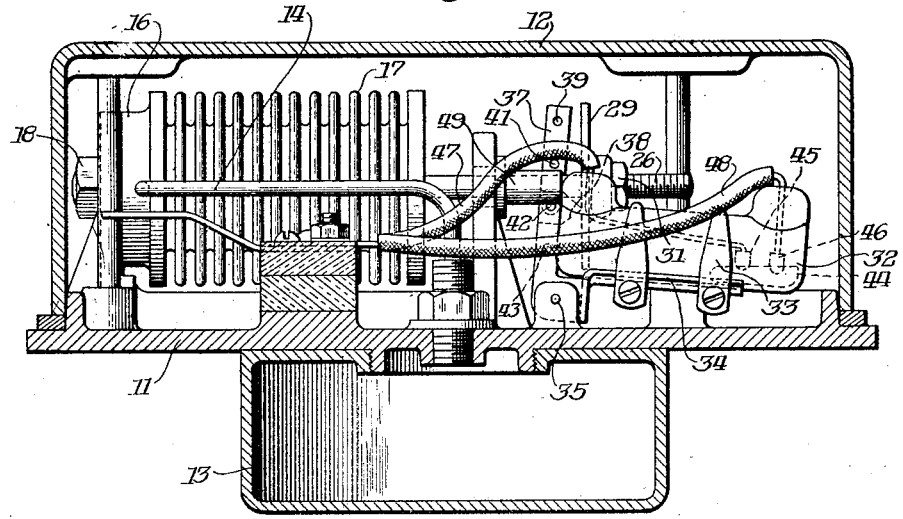

In this drawing:

Figure 1 is a horizontal section through the encasing housing, the bellows member also being illustrated in section, and Figure 2 is a longitudinal vertical section through the appliance.

By reference to this drawing, it will be seen that the improved apparatus includes a horizontal flat base-plate 11 and a housing cover or shell 12.

A hollow element 13 filled with the liquid referred to is mounted on the under side of such base-plate where it is readily subjected to temperature changes.

A conduit or tube 14 connects the interior of such liquid-charged member with a right-angle passage 15 in the stationary head or end 16 of the bellows member 17, such part 16 being fixedly mounted by a threaded stem and nut 18 on a stationary bracket 19 constituting part of the base-plate.

As is clearly shown, the corresponding end of the expansible and collapsible corrugated shell 17 is secured to the part 16, the latter having a central, hollow, cylindrical extension 21 projecting into the hollow interior of the bellows.

The opposite end of such accordion-shaped part is fastened to a complementary or companion movable end or head 22 having a cylindrical part 23 projecting in, and of only slightly less diameter than the inner diameter of, the bellows, the section 23 having a cylindrical bearing 24 slidingly receiving the projection 21, a passage 25 being provided to connect the inner end of the cavity 24 with the space between the elements 21, 23 and 17.

As will be readily understood, the chamber 13 and the interior of the bellows member 17 and all of the connections are completely filled with a suitable liquid, all of the joints being fluid tight as will be necessary.

Owing to the fact that the space in the bellows member is occupied in substantial measure by the telescoping elements 21 and 23 but comparatively little liquid is accommodated in the bellows, whereby changes in temperature of the liquid in the container or receptacle 13 will be the prime factor in determining the operation of the apparatus.

A shaft 26 is screwed centrally into the outer part of the head 22 and is adapted to slide in a bearing 27 supported in a bracket 28 forming part of the base-plate.

An abutment disc 29 is threaded on to the end portion of such shaft and is held thereon in adjusted position by a lock-nut 31, it being obvious that the position of the disc on the shaft may be varied by loosening the nut, turning the disc, and then again tightening the nut.

A hollow glass vessel or container 32 is fixedly mounted in a metal cradle or saddle 33 secured to an arm 34 fulcrumed at 35 and 36 on the base-plate, such arm having an upstanding arm 37 equipped with a demountable lug or finger 38 designed to bear on the inner face of disc 29, such lug being capable of attachment to the arm at any one of a plurality of points 39, 41, 42, and 43.

The glass receptacle contains a body of mercury 44 designed and adapted to make and break contact between two electric terminals 45 and 46 within the vessel and connected outside thereof to two electric conductors or leads 47 and 48.

Obviously, when the vessel is tilted in one direction, the mercury will flow down and bridge the gap between the contacts and close the electric circuit and when tilted in the opposite direction, the mercury will quickly flow down to the other end of the vessel breaking the circuit in so doing.

It will be noted that the mercury switch is so hinged that it tends by gravity to automatically become tilted to close the circuit and that this is permitted only when the bellows has expanded enough to allow the disc 29 to permit the arm 37 to swing forwardly sufficiently to accomplish the specified result.

When the bellows contracts, the disc is carried toward such member, rocking the arm and mercury container until the latter is inclined adequately to cause the mercury to flow away from the two terminals and thus break the circuit.

Excessive rocking of the switch in this direction is limited by a sleeve 49 on shaft 26 between the stationary bearing 27 and the disc 29 which prevents the latter, and the movable end of the bellows, through the connecting shaft, from moving inwardly beyond such predetermined position.

If the liquid in the bellows contracts or shrinks still further, a vacuum will be formed therein, but, inasmuch as the external atmospheric pressure is substantially constant and of known value, the bellows is made strong enough to withstand such tendency to collapse.

Regardless of the amount or degree of such contraction of the liquid, the outside pressure on the bellows can never exceed about fifteen pounds per square inch.

From the above description, it will be clear that the expansion of the bellows-member effected by the temperature increase in volume of the liquid contained therein and the associated liquid-filled receptacle is resisted solely by the external atmospheric pressure and that no spring or other similar means is employed to perform, or to assist in carrying out, that function.

The adjustment of the element 29 provides simple means for varying the temperature at which the appliance will operate, and, by varying the position of the lug 38, the range of temperature for the opening and closing of the switch may be modified, the higher such lug is located on its arm the greater such latitude of action or differential between the temperatures at which the switch will open and close.

The liquid used in the appliance, for instance, acetone, is one which does not gasify or vaporize at any temperature at which the device is intended to be used so that the system is always completely filled with liquid.

Those skilled in this art will readily understand that the invention is not limited and confined to the exact and precise details of structure illustrated and described and that these may be changed within radical degree without departure from the heart and essence of the invention and without the sacrifice of any of its material benefits and advantages, the scope of the invention being defined by the appended claims.

I claim:

1. The combination of an expansible and contractible thermostatic bellows member, having a fixed end and a movable end, a liquid completely filling the otherwise unoccupied space in said member under all operating conditions of the electric-switch, a shaft carried by said movable end, an abutment element on said shaft, a rockable electric-switch fulcrumed at one side of its center of gravity tending to swing automatically to normal position, and an arm rigid with said switch and bearing on that side of said element toward said bellows member, whereby movements of said end and abutment element control the action of said switch and said bellows member may expand beyond the normal position of said switch without disturbing the latter.

2. The combination of an expansible and contractible thermostatic bellows member having a fixed end and a movable end, a liquid completely filling the otherwise unoccupied space in said member under all operating conditions of the electric-switch, a shaft carried by said movable end, an abutment element on said shaft, a rockable electric-switch fulcrumed at one side of its center of gravity tending to swing automatically to normal position, and an arm rigid with said switch and bearing on that side of said element toward said bellows member, whereby movements of said end and abutment element control the action of said switch and said bellows member may expand beyond the normal position of said switch without disturbing the latter, and means to limit the contracting movement of said bellows end.

3. The combination of an expansible and contractible thermostatic bellows member having a fixed end wall and a movable end wall, a liquid completely filling the otherwise unoccupied space in said member under all switch-operating conditions, a shaft carried by said movable end, an abutment element adjustable on said shaft to vary the temperature at which the appliance operates, a rockable electric-switch fulcrumed at one side of its center of gravity tending to rock automatically to normal position, an arm rigid with said switch, and a lug bearing on the side of said element toward said movable wall and adjustable on said arm to vary the range of temperature at which the appliance operates, whereby movements of said end and abutment element control the action of said switch and said abutment element may continue to travel under further expansion of said member without influencing said switch after the latter has rocked to said normal position.

4. The combination of an expansible and contractible thermostatic bellows member having a fixed end wall and a movable end wall, a rockable electric-switch fulcrumed at one side of its center of gravity and tending to rock automatically to normal position, a liquid filling the otherwise unoccupied space in said bellows member under all switch-operating conditions, means associated with said bellows member movable end wall having a loose connection with said switch preventing the switch from rocking to such normal position until such liquid has reached a predetermined temperature and permitting further expansion of said bellows member without influencing the condition of said switch.

5. The combination of an expansible and contractible thermostatic bellows member having a fixed end wall and a movable end wall, a rockable electric-switch fulcrumed at one side of its center of gravity and tending to rock automatically to normal position, a liquid filling the otherwise unoccupied space in said bellows member under all switch-operating conditions, means associated with said bellows member movable end wall having a loose connection with said switch preventing the switch from rocking to such normal position until such liquid has reached a predetermined temperature and permitting further expansion of said bellows member without influencing the condition of said switch, and a stop limiting the contracting action of said movable end wall after said means has rocked said switch from said normal position, whereby further reduction of temperature of said liquid will produce a partial vacuum in said bellows member whereby the pressure on said member tending to collapse it is limited to not more than one atmosphere.

In witness whereof I have hereunto set my hand.

HERBERT J. SAUVAGE.